United States Patent
Howell et al.

(10) Patent No.: US 9,805,212 B1
(45) Date of Patent: *Oct. 31, 2017

(54) SECURE FILE TRANSFER

(71) Applicant: Wickr Inc., San Francisco, CA (US)

(72) Inventors: Christopher A. Howell, Freehold, NJ (US); Thomas Michael Leavy, Hoboken, NJ (US); David A. Sugar, Cape May, NJ (US); Dipakkumar R. Kasabwala, Clifton, NJ (US); Ernest W. Grzybowski, Edison, NJ (US)

(73) Assignee: Wickr Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,065

(22) Filed: Dec. 15, 2016

Related U.S. Application Data (63) Continuation of application No. 15/190,132, filed on Jun. 22, 2016, now Pat. No. 9,590,958.

(60) Provisional application No. 62/322,664, filed on Apr. 14, 2016.

(51) Int. Cl.
  *G06F 21/62* (2013.01)
  *H04L 9/32* (2006.01)
  *H04L 29/06* (2006.01)

(52) U.S. Cl.
  CPC ........ *G06F 21/6218* (2013.01); *H04L 9/3234* (2013.01); *H04L 63/061* (2013.01)

(58) Field of Classification Search
  CPC .. G06F 21/6218; H04L 9/3234; H04L 63/061
  See application file for complete search history.

(56) References Cited

U.S. PATENT DOCUMENTS

| | | | |
|---|---|---|---|
| 5,953,419 | A | 9/1999 | Lohstroh et al. |
| 6,145,079 | A | 11/2000 | Mitty et al. |
| 6,405,315 | B1 | 6/2002 | Burns et al. |
| 6,947,556 | B1 | 9/2005 | Matyas et al. |
| 7,178,021 | B1 | 2/2007 | Hanna et al. |
| 7,197,537 | B2 | 3/2007 | Koch |
| 7,308,477 | B1 | 12/2007 | Gress et al. |
| 8,364,984 | B2 | 1/2013 | Jeffries et al. |
| 8,412,934 | B2 | 4/2013 | Atley et al. |

(Continued)

OTHER PUBLICATIONS

Green et al. "Dancing on the Lip of the Volcano—Chosen Ciphertext Attacks on Apple iMessage" Mar. 21, 2016.

(Continued)

*Primary Examiner* — Darren B Schwartz
(74) *Attorney, Agent, or Firm* — Christian LaForgia (57) ABSTRACT

The present disclosure describes techniques for storing encrypted files in a secure file repository and transferring those encrypted files to one or more recipients. A user selects a file to upload to a secure file repository. A secure collaboration app on the user's device generates a first encryption key that is used to encrypt the file. The encrypted file is then uploaded to the secure file repository, which provides the secure collaboration app with a random file name and a location of the encrypted file. The secure collaboration app updates locally stored metadata of the first encrypted file. To securely transfer the file, the user generates a second encryption key, encrypts the metadata with the second encryption key, and transmits the encrypted metadata to one or more receivers. The one or more receivers decrypt the encrypted metadata and use the decrypted metadata to retrieve the file and decrypt it.

18 Claims, 9 Drawing Sheets

(56) References Cited

U.S. PATENT DOCUMENTS

| | | |
|---|---|---|
| 8,433,901 B2 | 4/2013 | Atley et al. |
| 8,478,893 B2 | 7/2013 | Hiie |
| 8,489,889 B1 | 7/2013 | Moscaritolo et al. |
| 8,510,552 B2 | 8/2013 | Atley et al. |
| 8,572,757 B1 | 10/2013 | Stamos et al. |
| 8,588,425 B1 | 11/2013 | Harwood et al. |
| 8,589,673 B2 | 11/2013 | Ackerly |
| 8,589,680 B2 | 11/2013 | Atley et al. |
| 8,601,263 B1 | 12/2013 | Shankar et al. |
| 8,625,805 B1 | 1/2014 | Statica et al. |
| 8,631,227 B2 | 1/2014 | Olechowski et al. |
| 8,677,136 B2 | 3/2014 | Brokenshire et al. |
| 8,689,015 B2 | 4/2014 | Jeffries et al. |
| 8,756,419 B2 | 6/2014 | Atley et al. |
| 8,762,712 B1 | 6/2014 | Kwan et al. |
| 8,788,842 B2 | 7/2014 | Brouwer et al. |
| 8,874,902 B2 | 10/2014 | Ackerly |
| 8,948,391 B2 | 2/2015 | Kritt et al. |
| 9,077,525 B2 | 7/2015 | Chandran et al. |
| 9,078,127 B2 | 7/2015 | Kritt et al. |
| 9,225,709 B2 | 12/2015 | Ackerly |
| 9,237,016 B2 | 1/2016 | Atley et al. |
| 9,288,047 B2 | 3/2016 | Brouwer et al. |
| 2002/0002468 A1 | 1/2002 | Spagna et al. |
| 2002/0038296 A1 | 3/2002 | Margolus et al. |
| 2002/0038421 A1 | 3/2002 | Hamada |
| 2002/0094085 A1 | 7/2002 | Roberts |
| 2002/0166053 A1 | 11/2002 | Wilson |
| 2003/0208686 A1 | 11/2003 | Thummalapally et al. |
| 2004/0078568 A1 | 4/2004 | Pham et al. |
| 2005/0005106 A1 | 1/2005 | Chen et al. |
| 2005/0044059 A1 | 2/2005 | Samar |
| 2005/0076061 A1 | 4/2005 | Cox |
| 2005/0102528 A1 | 5/2005 | Tan et al. |
| 2005/0229257 A1 | 10/2005 | Kim et al. |
| 2005/0262338 A1 | 11/2005 | Irwin |
| 2005/0273592 A1 | 12/2005 | Pryor et al. |
| 2007/0005713 A1 | 1/2007 | LeVasseur et al. |
| 2007/0011469 A1 | 1/2007 | Allison et al. |
| 2007/0016771 A1 | 1/2007 | Allison et al. |
| 2007/0276836 A1 | 11/2007 | Chatterjee et al. |
| 2007/0277240 A1 | 11/2007 | Durfee et al. |
| 2008/0065878 A1 | 3/2008 | Hutson et al. |
| 2009/0097662 A1 | 4/2009 | Olechowski et al. |
| 2009/0100268 A1 | 4/2009 | Garcia et al. |
| 2010/0239087 A1 | 9/2010 | Chaisson et al. |
| 2010/0250939 A1 | 9/2010 | Adams et al. |
| 2010/0262714 A1 | 10/2010 | Hiie |
| 2011/0307707 A1 | 12/2011 | Fielder |
| 2012/0045064 A1 | 2/2012 | Rembarz et al. |
| 2012/0159164 A1 | 6/2012 | Brown et al. |
| 2012/0179905 A1 | 7/2012 | Ackerly |
| 2013/0034229 A1 | 2/2013 | Sauerwald et al. |
| 2013/0073850 A1 | 3/2013 | Zaverucha |
| 2013/0091298 A1 | 4/2013 | Ozzie et al. |
| 2013/0136255 A1 | 5/2013 | Brown |
| 2013/0198522 A1 | 8/2013 | Kohno et al. |
| 2013/0254537 A1 | 9/2013 | Bogorad |
| 2014/0052982 A1 | 2/2014 | Ackerly |
| 2014/0068254 A1 | 3/2014 | Scharf et al. |
| 2014/0157435 A1 | 6/2014 | Stamos et al. |
| 2014/0164776 A1 | 6/2014 | Hook et al. |
| 2014/0169554 A1 | 6/2014 | Scarisbrick et al. |
| 2014/0258719 A1 | 9/2014 | Cidon et al. |
| 2014/0351586 A1 | 11/2014 | Hook et al. |
| 2015/0006884 A1 | 1/2015 | Ackerly |
| 2015/0121549 A1 | 4/2015 | Baessler et al. |
| 2015/0169893 A1 | 6/2015 | Desai |
| 2015/0215291 A1 | 7/2015 | Abdunabi et al. |
| 2015/0244658 A1 | 8/2015 | Speyer et al. |
| 2015/0244684 A1 | 8/2015 | Ng et al. |
| 2015/0347770 A1 | 12/2015 | Whalley et al. |
| 2016/0013939 A1 | 1/2016 | Jun et al. |
| 2016/0036791 A1 | 2/2016 | Sauerwald et al. |
| 2016/0063258 A1 | 3/2016 | Ackerly |

OTHER PUBLICATIONS

Leach et al. "A Universally Unique Identifier (UUID) URN Namespace" Standards Track, Jul. 2005.

SECURE FILE TRANSFER

CROSS-REFERENCE TO RELATED APPLICATIONS

This application is a continuation of co-pending U.S. patent application Ser. No. 15/190,132, entitled SECURE FILE TRANSFER filed Jun. 22, 2016 which is incorporated herein by reference for all purposes, which claims priority to U.S. Provisional Application No. 62/322,664, entitled, SECURE FILE TRANSFER, filed Apr. 14, 2016, the entirety of which is herein incorporated by reference.

BACKGROUND OF THE INVENTION

As mobile devices become more powerful, file sharing (e.g., between various users of various devices) continues to increase. As a result, files wind up with unintended receivers. This could be due to a legitimate receiver forwarding the file or the sender inadvertently sharing the file. File sharing issues are especially problematic for companies as employees become increasingly mobile and use their own devices to transfer and receive work-related files.

BRIEF DESCRIPTION OF THE DRAWINGS

Various embodiments of the invention are disclosed in the following detailed description and the accompanying drawings.

DETAILED DESCRIPTION

The present disclosure describes a system and method for transmitting a file securely. In particular, the systems and methods disclosed herein describe techniques for encrypting a file, storing the file with a secure file repository, sharing the file with one or more receivers, and transmitting the key to the one or more receivers via a separate communication.

The present disclosure can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. These implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications, and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

Figure 1:
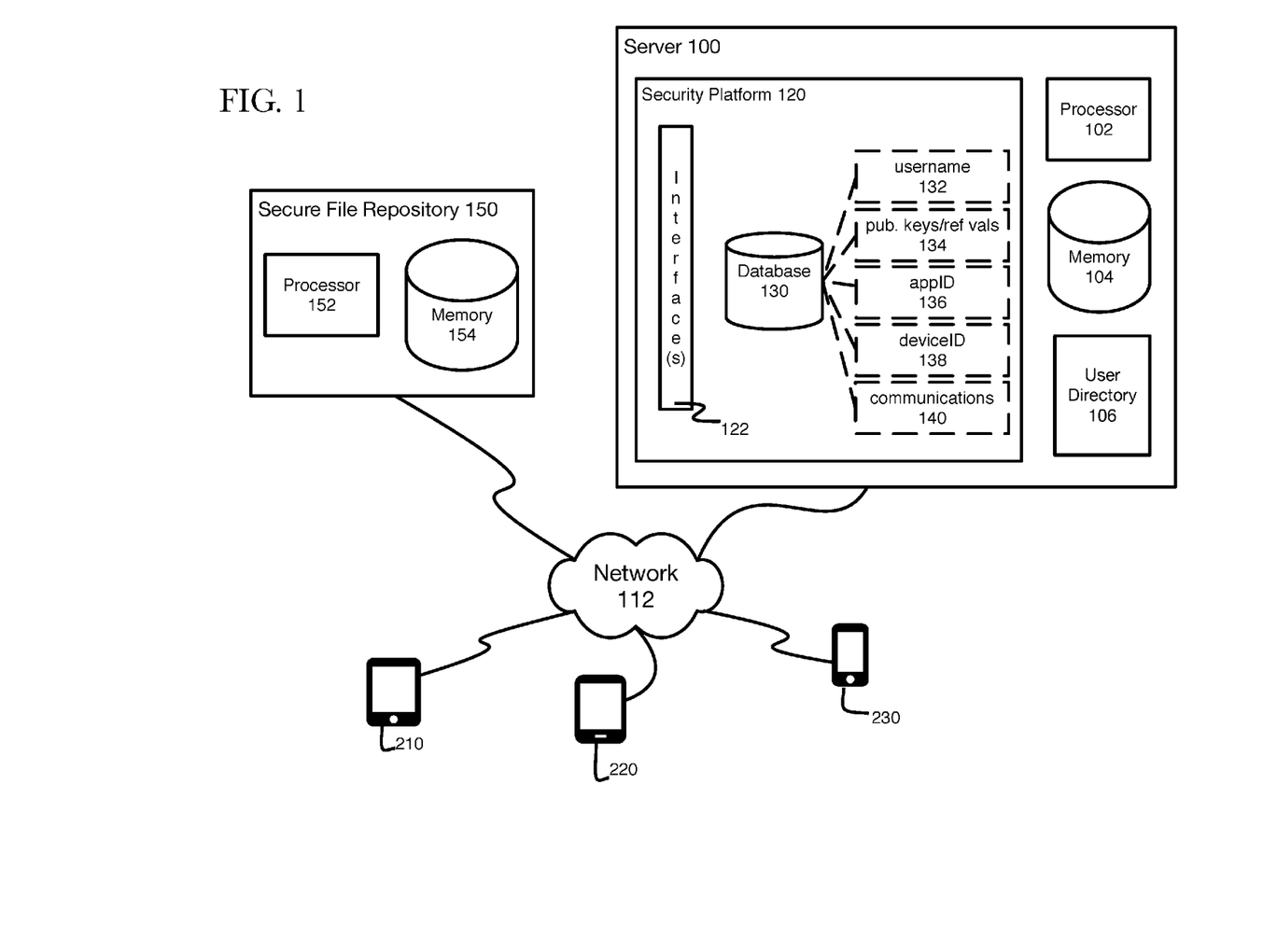
FIG. 1 illustrates a system for providing secure communications according to one embodiment of the disclosure.

FIG. 1 illustrates an embodiment of an environment in which secure communications are exchanged. In particular, FIG. 1 illustrates a first client device 210, a second client device 220, and a third client device 230 connected to security platform 120, located on server 100, via network 112. Additionally, FIG. 1 illustrates a secure file repository 150 accessible by the first client device 210, second client device 220, third client device 230, and security platform 120 through network 112.

According to the embodiments described herein, secure communications are exchanged using secure communication containers, which encapsulate a sender's communication. The secure communication container also allows information such as encryption information, hardware binding information, message security controls, and decryption information—for multiple receivers (as applicable)—to securely travel with the message. The secure communication container also provides cross-platform support so that users may communicate regardless of their operating systems (e.g., Linux, iOS, and Windows), smart phone platforms (e.g., iPhone, Android, Windows, Blackberry, etc.), and device types (e.g., mobile smart phones, tablets, laptops, desktops, etc.). Using the techniques described herein, only intended accounts on intended devices are able to decrypt the communications. Thus, for example, the security platform 120 is unable to decrypt communications. As will further be described in more detail below, using the techniques described herein, communicants can maintain a forward secret secure messaging channel, whether communicating synchronously (e.g., where all communicants are online or otherwise able to communicate with platform 120) or asynchronously (e.g., where at least one communicant is offline or otherwise not in communication with platform 120).

As shown in FIG. 1, security platform 120 may be implemented on server 100. Server 100 may include a processor 102, memory 104, user directory 106, and the security platform 120. In this regard, server 100 may be a stand-alone server, a corporate server, or a server located in a server farm or cloud-computing environment. In some embodiments, the server 100 may be a cloud service provider running a virtual machine configured to provide security platform 120 to an enterprise in the context of Software as a Service (SaaS).

Processor 102 may be any processor capable of interacting with memory 104, user directory 106, and security platform 120. In this regard, processor 102 may include a processor, multiprocessors, a multicore processor, or any combination thereof. Alternatively, processor 102 may be a dedicated controller, such as an Application Specific Integrated Circuit (ASIC) or Field Programmable Gate Array (FPGA). As will be described in more detail below, processor 102 may perform a plurality of tasks on behalf of security platform 120. Furthermore, whenever platform 120 is described as performing a task, either a single component or a subset of components or all components of platform 120 or enterprise server 100 may cooperate to perform the task. For example, platform 120 may generate and assign a random file name to files uploaded to the secure file repository.

Memory 104 stores information accessible by processor 102, including instructions and data that may be executed or otherwise used by the processor 102. Memory 104 may be any type of media capable of storing information accessible by the processor, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Memory 104 may include short term or temporary storage as well as long term or persistent storage. According to some embodiments, memory 104 may include a storage area network (SAN) accessible by the security platform 120.

User directory 106 may be any database or table capable of providing directory services. For example, user directory 106 may include a corporate directory that includes employees' first and last names, usernames, email addresses, phone numbers, department information, etc. Alternatively, user directory 106 may be a database or table to maintain user information for users of security platform 120. In this regard, user directory 106 may be encrypted. In some embodiments, user directory 106 may serve as a secure directory that includes a table of hashed usernames, a table of appIDs, and a table of deviceIDs for a secure messaging app. Accordingly, user directory 106 may be used to share information about users, systems, networks, services, and applications. According to some embodiments, the user directory 106 may include a Lightweight Directory Access Protocol (LDAP).

Although FIG. 1 illustrates processor 102, memory 104, user directory 106, and security platform 120 as being located on server 100, processor 102 and memory 104 may comprise multiple processors and memories that may or may not be stored within the same physical housing. For example, memory 104 may be a hard drive or other storage media located in a storage array of a data center. Accordingly, references to a processor, a computer, or a memory will be understood to include references to a collection of processors or computers or memories that may or may not operate in parallel. Further, the user directory 106 may be located in a separate physical housing from processor 102 and memory 104. Moreover, security platform 120 may be distributed across multiple servers.

Security platform 120 may be configured to facilitate the exchange of communications for users of a secure collaboration app. As used herein, "communications" and "messages" may take a variety of forms, including: text messages, chat room messages, file sharing, file collaboration, control messages, commands, e-mails, documents, audiovisual files, Short Message Service messages (SMSes), voice calls (i.e., VOIP), video calls, and video conferences. Additionally, the content of the messages and/or communications may pertain to electronic transactions, such as credit card security, password protection, directories, storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. The exchange of messages and/or communications is explained in further detail below.

Security platform 120 may provide encrypted communications that easily integrate into and secure existing systems while also providing compliant and secure communications. In this regard, security platform 120 may integrate with existing identity systems, such as user directory 106. Further, security platform 120 may include built-in support for enterprise data retention and support systems.

Security platform 120 may also include database 130. Database 130 may be a relational database that stores information in a variety of tables. In this regard, database 130 may include a record for each user of platform 120 to allow users to find other users and communicate with other users. Accordingly, database 130 may include a table of hashed usernames 132, a table of public keys and reference values 134, a table of appIDs 136, and a table of deviceIDs 138. Each user record may include a hashed username in table 132, a pool of ECDH public components and associated reference values in table 134, app ID(s) in table 136, and deviceID(s) in table 138. Additionally, each user record may store privacy mode and privacy list entries to control with whom the user may communicate. Additionally, database 130 may include a table of communications 140. That is, the security platform may store communications for users for a predetermined time in table 140. For example, when a message is received, the security platform may store the message in the table of communications and provide an alert, such as a push notification, to the receiver. Accordingly, a receiver may access the security platform to obtain his or her communications stored in table 140. In various embodiments, table 140 may store communications for 30 days; however, this may be adjusted, as needed, based on industry standards and/or to comply with regulatory schemes.

While a database is shown in FIG. 1, other techniques can be used to store the information used by platform 120 to facilitate exchange of communications. For example, the table of communications may be stored in a separate storage, such as memory 104, instead of being stored within database 130. Alternatively, the information contained in the database may be divided between database 130 and user directory 106. In this regard, database 130 and user directory 106 may interface to exchange information. Further, additional information can be securely stored on platform 120, whether in database 130 or another appropriate location, such as user verification information and user verification settings.

Security platform 120 may include one or more interface(s) 122 for communicating with client devices 210, 220, and 230. As one example, platform 120 may provide an application programming interface (API) configured to communicate with apps installed on client devices. Further, platform 120 may also include APIs for interacting with the secure file repository 150. Additionally, platform 120 may provide other types of interfaces, such as a web interface, or stand alone software programs for desktops and laptops, running on various Operating Systems (OSes). The web interface may allow users of client devices to exchange communications securely (whether with one another or other users), without the need for a separately installed collaboration application. The standalone software program may allow users to exchange secure communications via software that is downloaded by each user. According to some embodiments, platform 120 may make available a master clock time available via the one or more interface(s) 122. The master clock time may be used by client apps to enforce secure time-to-live (TTL) values of communications. The TTL values can be used to enforce (e.g., on behalf of a sender) time constraints on communication access (e.g., by a receiver).

Users of client devices, such as client devices 210, 220, 230, may communicate securely with one another using the techniques described herein. For example, client devices 210, 220, 230 may make use of the security platform 120 and the techniques described herein via a secure collaboration app (not shown). As shown in FIG. 1, client devices may be mobile devices, such as a laptop, smart phone, or tablet, or computing devices, such as desktop computers or servers. As noted above, the secure collaboration app described herein allows cross-platform communications, thereby allowing users of various devices to communicate seamlessly. Further, each user may have different instances of the collaboration app across multiple devices. That is, the user of device 210 may be able to receive communications on both device 210, as well as on any other devices that the user may have that include a copy of the secure collaboration app, such as a laptop. In some embodiments, client devices 210, 220, 230 may be the users' personal devices (i.e., a bring your own device (BYOD) scenario). Alternatively, client devices may include other types of devices, such as game consoles, camera/video recorders, video players (e.g., incorporating DVD, Blu-ray, Red Laser, Optical, and/or streaming technologies), smart TVs, and other network-connected appliances, as applicable.

Communications between users of client devices 210, 220, 230 may be exchanged via network 112. Network 112 may include various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing.

Additionally, client devices 210, 220, 230 may also access the secure file repository 150 via network 112. In various embodiments, the secure file repository includes a file management system that is hosted and maintained by the security platform 120. In alternative embodiments, the secure file repository may be a third-party file management system, such as Dropbox, Box, Google Drive, etc. According to the alternative embodiments, the secure collaboration apps located on client devices 210, 220, 230 may include interfaces, such as APIs, to access the secure file repository 150.

The secure file repository 150 includes a processor 152 and a memory 154, which are similar to the processor 102 and memory 104 previously discussed. Additionally, memory 154 may support a file management system (not shown). In this regard, users may upload content, such as files, documents, spreadsheets, images, animated gifs, videos, etc., to the secure file repository 150 using the secure collaboration apps located on their client devices. In this regard, the secure collaboration app allows clients to encrypt the files before uploading them to the secure file repository. In this regard, clients may use the secure file repository to store information in a secure manner (e.g., encrypted) for later retrieval. Alternatively, clients may use the secure file repository to transfer information to other users of the secure collaboration app.

Figure 2:
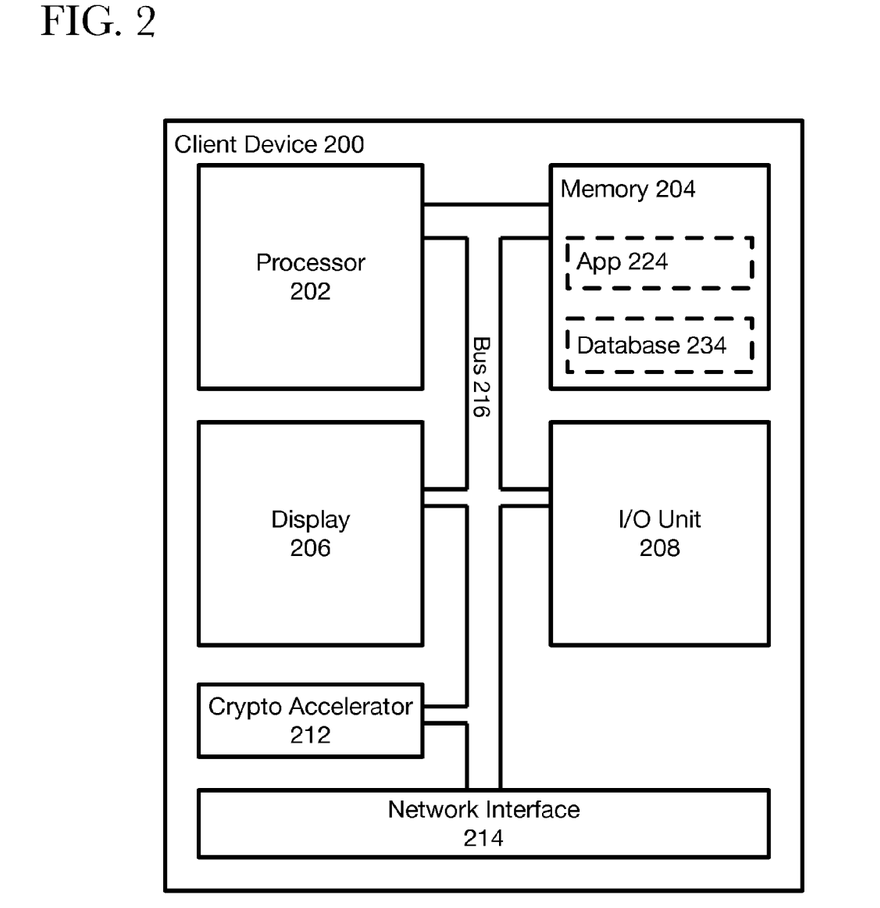
FIG. 2 illustrates a client device that transmits and receives encrypted communications using a secure messaging app.

FIG. 2 illustrates an exemplary client device 200 that may access the security platform 120 via a secure collaboration app. In this regard, client device 200 includes a processor 202, a memory 204, a display 206, an I/O unit 208, a cryptographic ("crypto") accelerator 212, and a network interface 214 all interconnected by bus 216.

Processor 202 may be any processor capable of interacting with the components of client device 200. For example, processor 202 may include a processor, multiprocessors, multicore processor, a dedicated controller, such as an ARM processor, an ASIC, or an FPGA, or any combination thereof. Memory 204 may store information accessible by processor 202, including instructions and data that may be executed or otherwise used by the processor 202 and/or crypto accelerator 212. For example, memory 204 may store instructions, such as app 224. In various embodiments, app 224 may be a secure collaboration app that provides users with the ability to participate in voice and video calls, share encrypted content, and exchange encrypted communications. Encrypted communications may include direct communications (e.g., one-to-one communications between a sender and receiver), group chats, or secure chat room communications. Data stored by memory 204 may include database 234. Database 234 may be encrypted via an encryption algorithm, such as Advanced Encryption Standard (AES), and a 256-bit key, referred to hereinafter as a local storage key. In some embodiments, database 234 may be used to store information related to secure collaboration app 224. For example, database 234 may index information related to the secure collaboration app, such as key information, user information, friend information, and communications. In this regard, communications transmitted and received by the secure collaboration app, including a message identifier, a hash of the sender's username, a hash of the sender's appID, a hash of the receiver's username, a hash of the receiver's appID, the message encryption key, and a timestamp of each communication may be stored in database 234. Accordingly, memory 204 may be any type of media capable of storing the information above, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 204 may include short term or temporary storage as well as long term or persistent storage.

Display 206 may be any electronic device capable of visually presenting information. In mobile devices, such as smart phones and tablets, display 206 may be a touchscreen display. In this regard, display 206 may be integrated with I/O unit 208 to detect user inputs, as well as output data. In computing devices, display 206 may be an output, such as a VGA, DVI, or HDMI output, configured to connect to a monitor. I/O unit 208 may be capable of receiving input from a user. As noted above, the I/O unit 208 may work with touchscreen displays to receive input from a user. Alternatively, the I/O unit may be an interface capable of interacting with input and output devices, such as keyboards, mice, monitors, printers, etc. Additionally, the I/O unit 208 may include at least one accelerometer, a Global Positioning Satellite (GPS) system, a magnetometer, a proximity sensor, an ambient light sensor, a moisture sensor, a gyroscope, etc. to determine the orientation of the device, as well as environmental factors.

Crypto accelerator 212 may be dedicated hardware, software, or any combination thereof that is capable of performing cryptographic operations, such as key generation, random number generation, encryption/decryption, signature generation, signature verification, etc. In various embodiments, crypto accelerator 212 is a dedicated processor configured to perform cryptographic operations on behalf of processor 202. In this regard, app 224 may make use of crypto accelerator 212 to provide the secure communication functions described in greater detail below.

Network interface 214 may be dedicated hardware, software, or any combination thereof that is capable of connecting client device 200 to network 112. In this regard, network interface 214 may include various configurations and use various communication protocols including Ethernet, TCP/IP, ATM, cellular and wireless communication protocols (e.g., 802.11, LTE), instant messaging, HTTP and SMTP, and various combinations of the foregoing.

Figure 3A:
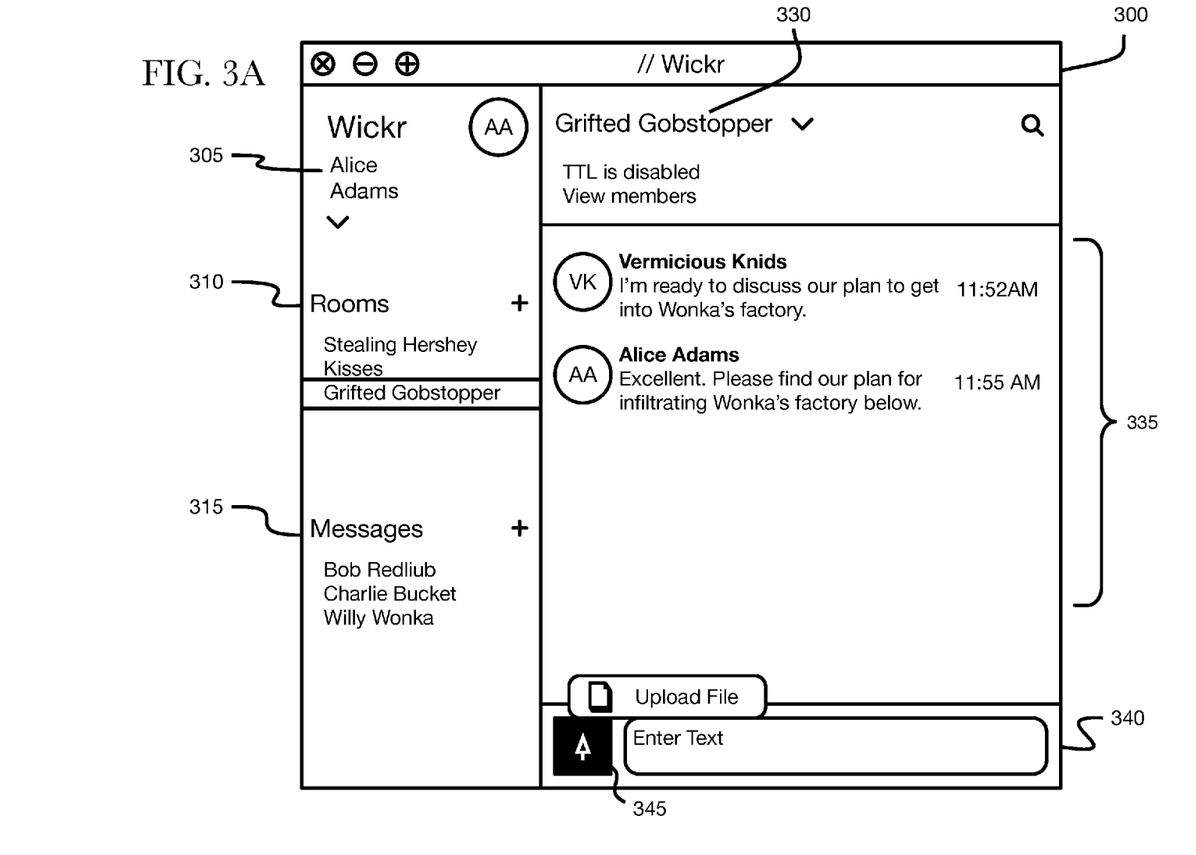
FIGS. 3A and 3B illustrate an example of an interface for a secure file transfer.
Figure 3B:
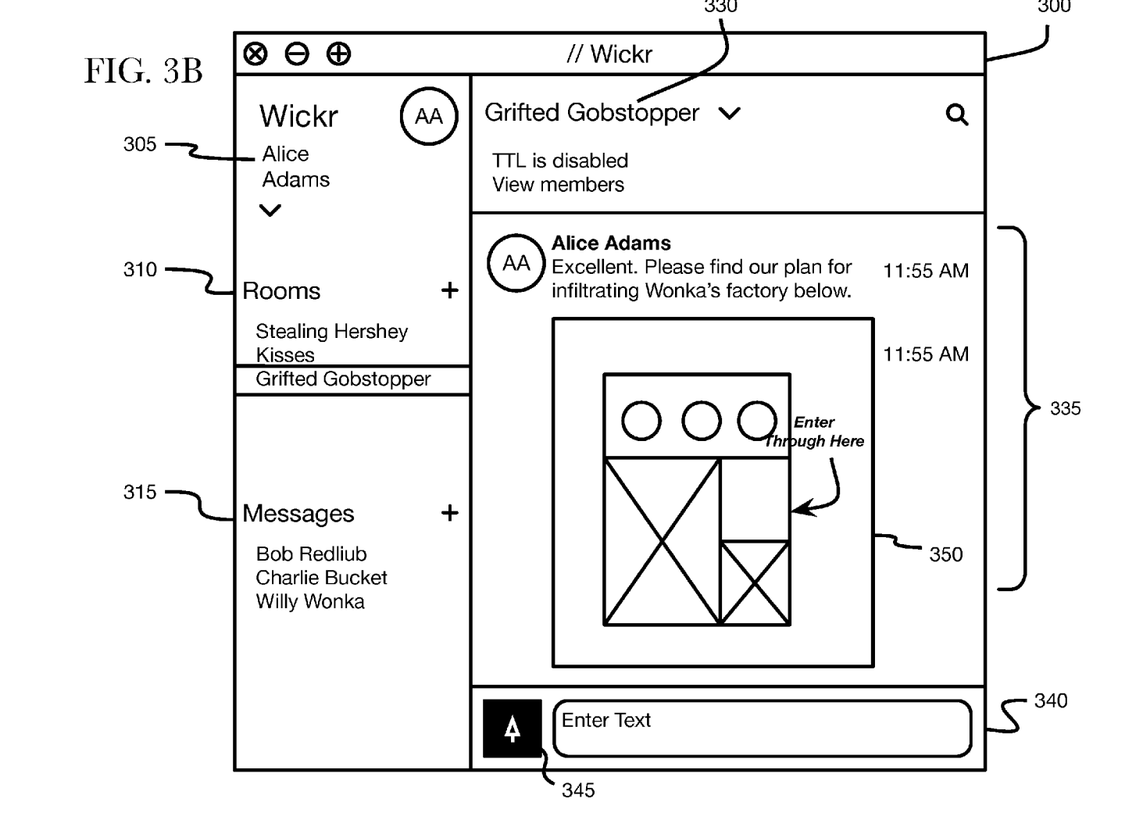

FIGS. 3A and 3B illustrate an example of an interface 300 for exchanging cryptographic communications and securely transferring files. The interface 300 includes user information field 305, which displays user information including the user's name, their username, and an avatar that is displayed to other users. As shown in FIGS. 3A and 3B, the interface 300 belongs to Alice Adams. Additionally, the interface 300 may include a room identification field 310 and a message identifier field 315. The room identification field 310 and a message identifier field 315 may indicate the secure chat rooms the user is participating in and the open one-to-one communications the user has open, respectively.

FIGS. 3A and 3B illustrate that Alice Adams is participating in a secure chat room. This is reflected by the highlighted field (e.g., "Grifted Gobstopper") under the room identification field 310. Additionally, a header 330 shows general information about the communication that the user is participating in. For example, the header 330 may include the name of the secure chat room or one-to-one communication, a TTL for all communications, the members of the secure chat room, and a search field. Below the header, a conversation field 335 is shown. The conversation field 335 may include the communications, including messages, shared images, videos, voice recordings, etc., exchanged between users. Below the conversation field is a user input field 340. The user input field 340 allows a user to enter text and send the text to other communicants. Additionally, the user input field 340 may include an upload button 345, which allows clients to share content in a secure manner. In particular, clients may select the upload button 345 which may prompt the client to select a file from their device. Alternatively, selecting the upload button 345 may prompt the client to take a picture, which will then be uploaded and displayed in the conversation field 335. In this regard, any selected files will be encrypted before being shared with other communicants, as discussed in greater detail below.

Turning to FIG. 3B, an example of a secure file shared with a communicant is shown. Specifically, image 350 appears in conversation field 335. Image 350 may be subject to the same constraints as other communications. For example, if there were a TTL set for communications, the image 350 would be removed from the conversation field upon expiration of the TTL. Furthermore, additional constraints may be put on shared content. For instance, recipients may not be able to screen shot, forward, download, or otherwise share the received file.

Figure 4:
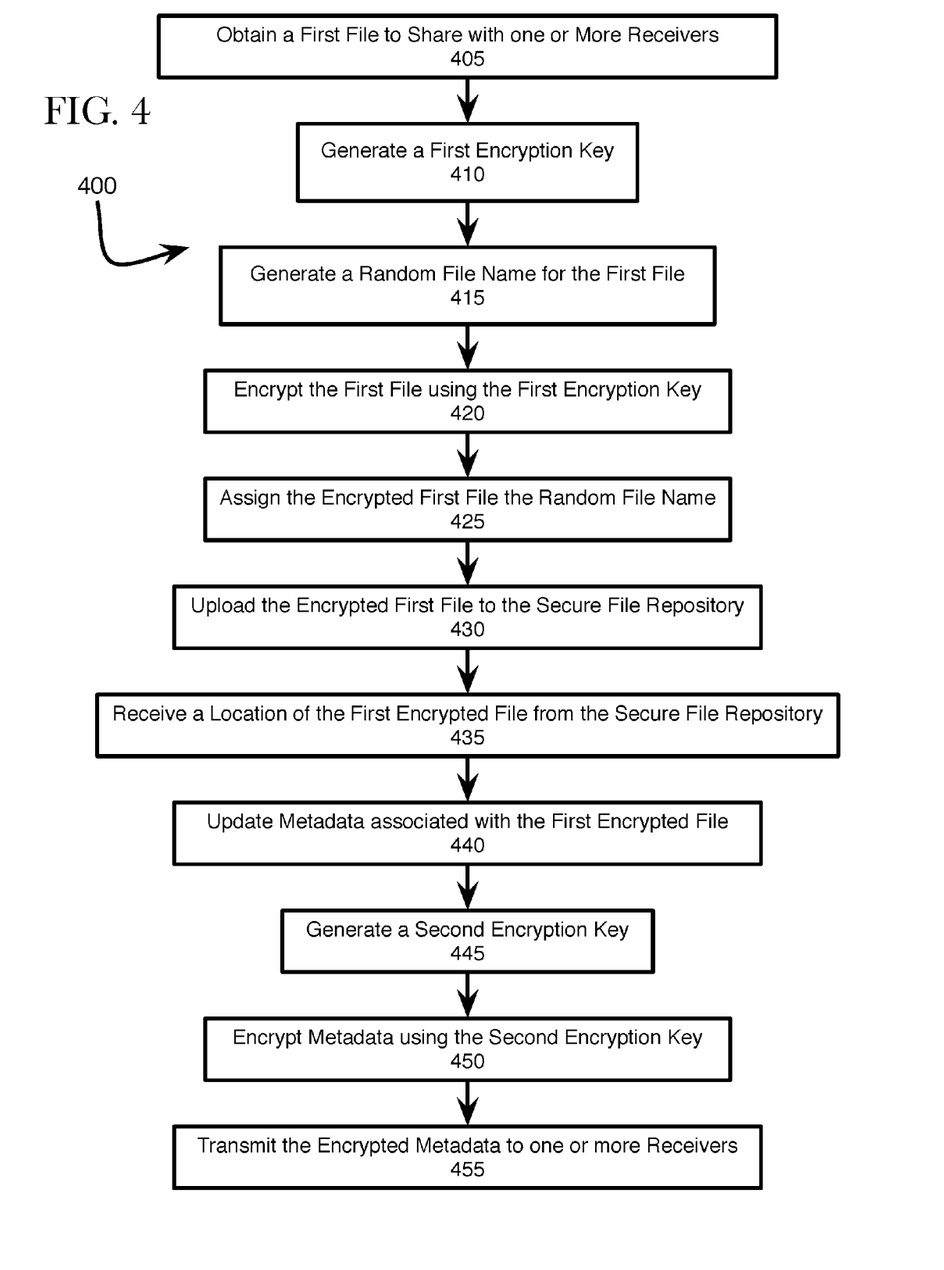
FIG. 4 illustrates a process for securely transferring content.

As noted above, the secure collaboration app allows clients to securely transfer files with other clients. FIG. 4 illustrates a process 400 for securely transferring files. Process 400 begins in block 405, where the secure collaboration app obtains a first file to share with one or more receivers. The first file may be obtained locally from the client's device and include documents, spreadsheets, presentations, images, animated gifs, videos, etc. Alternatively, obtaining a first file may include activating the client device's camera and capturing a new image or video. In other embodiments, obtaining a first file may include activating a microphone and recording a voice recording for transmission to the one or more receivers. In still further embodiments, obtaining the first file may include accessing a secure file repository, using an API provided via the secure collaboration app, to select a stored file.

After the first file is obtained, the secure collaboration app generates a first encryption key in block 410. In various embodiments, the first encryption key is a 256-bit key generated by the secure collaboration app by applying multiple rounds of a hash function (e.g., SHA256, SHA384, SHA521) to a first set of pseudorandom bytes derived from a sending client's device. The first set of pseudorandom bytes may be derived from ephemeral environmental noise obtained from device drivers and other kernel operations. For example, data from the various sensors (e.g., the at least one accelerometer, Global Positioning Satellite (GPS) system, magnetometer, proximity sensor, ambient light sensor, moisture sensor, and gyroscope) may be used as the first set of pseudorandom bytes.

In block 415, the secure collaboration app generates a random file name for the first file. In various embodiments, the random file name is a 128-bit universally unique identifier that is generated in accordance with RFC 4122: A Universally Unique Identifier (UUID) URN Namespace, the entirety of which is herein incorporated by reference. Next, in block 420, the secure collaboration app encrypts the first file using the first encryption key. Preferably, the secure collaboration app on the sending client's device relies on the crypto processor to encrypt the first file using a symmetric encryption algorithm, such as Advanced Encryption Standard (AES), Data Encryption Standard (DES), or Triple DES (3DES). Once the first file is encrypted, the secure collaboration app assigns the random file name to the first encrypted file in block 425.

In block 430, the secure collaboration app uploads the first encrypted file to the secure file repository. In various embodiments, the secure file repository is part of the security platform 120. In alternative embodiments, the secure file repository may be operated by a third-party, such as Dropbox, Box, or Google Drive. In block 435, the sending client's secure collaboration app receives a location of the first encrypted file from the secure file repository.

In block 440, the sending client's secure collaboration app updates metadata associated with the first encrypted file. Specifically, the secure collaboration app will update the name of the file, as well as the location of the first encrypted file in the secure file repository. Further, the secure collaboration app will add the first encryption key to the metadata, for example, as a property of the file. In this regard, the sending client's secure collaboration app maintains a record of the first encrypted file. This record may be stored in database 234 in the sending client device's memory 204. In embodiments where the client device is merely storing the first encrypted file with a secure file repository, the process 400 ends here. However, if the client device is sharing the first encrypted file with one or more receivers, process 400 proceeds to block 445 where the sending client's secure collaboration app generates a second encryption key. Similar to the first encryption key, the second encryption key is a 256-bit key derived by applying multiple rounds of a hash function to a second set of pseudorandom bytes derived from the sending client's device.

In block 450, the sender's secure collaboration app encrypts the first encrypted file's metadata, including the first encryption key, using the second encryption key. In some embodiments, the first encrypted file's metadata is encrypted using a symmetric encryption algorithm. The encrypted metadata is then transmitted to one or more receivers in block 455.

Figure 5:
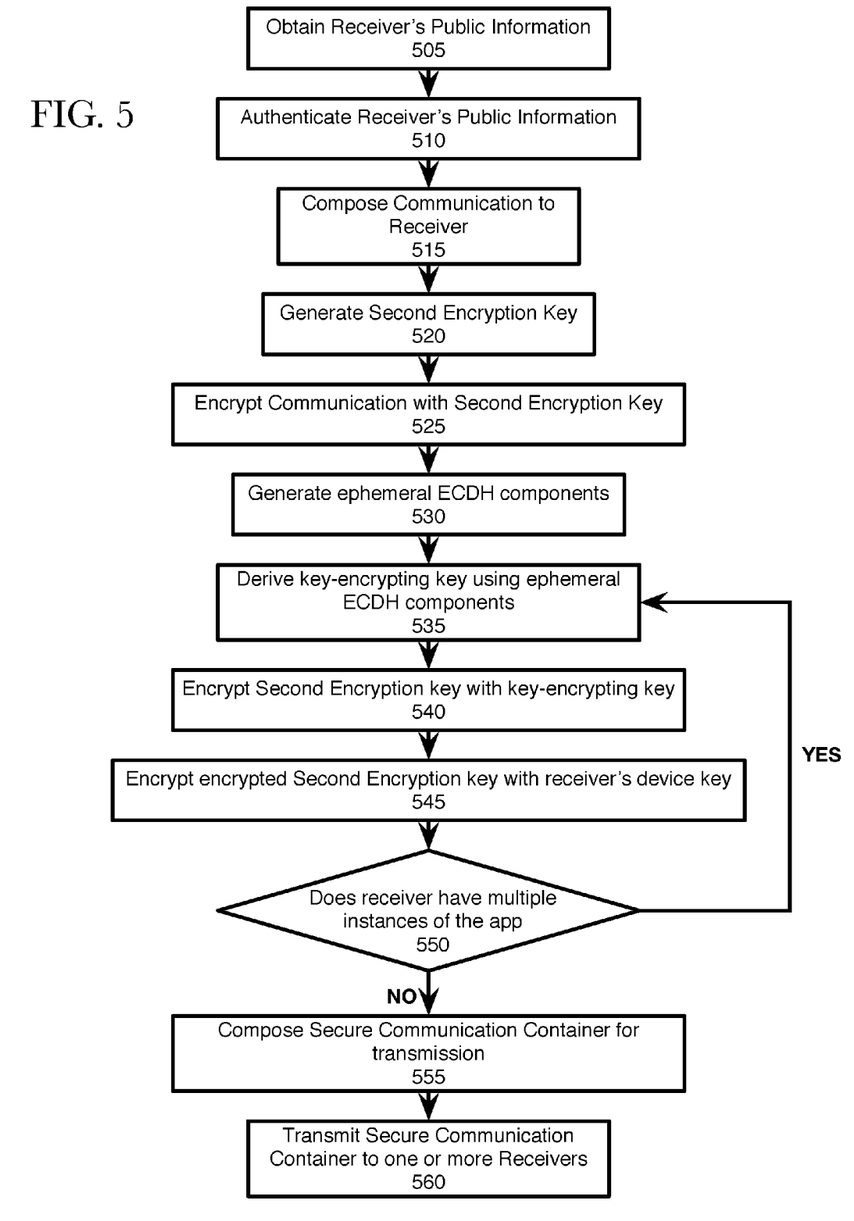
FIG. 5 illustrates a method for transmitting encrypted communications.

Turning to FIG. 5, a detailed process for transmitting encrypted communications, including the encrypted metadata, to one or more receivers is illustrated. The method begins in block 505, with the sending client's secure collaboration app obtaining the one or more receivers' public information from the security platform. In this regard, each receiver's public information may include at least one of the receiver's app ID, user-level signing public key, a signed app-level signing public key, a signed ephemeral ECDH public component, an identifier of the ephemeral ECDH public component, and the receiver's device key. In various embodiments, the security platform randomly selects one of the signed ephemeral ECDH public components from a pool of public components that the receiver has previously uploaded. In order to prevent the selected public component from being used for a subsequent communication, the security platform will delete the selected ephemeral ECDH public component after providing it to the sending client's device. If a receiver has multiple instantiations of the secure collaboration app installed on different devices, the sender's secure collaboration app will receive a unique signed app-level signing public key, signed ephemeral ECDH public component, identifier of the ephemeral ECDH public component, and device key for each instance of app in block 505. The multiple instance information may be provided in an arrayed response by the security platform.

In block 510, the sender's secure collaboration app authenticates the public information received from the security platform. In particular, the user-level signing public key received from the security platform is used to verify a signature attached to the app-level signing public key. If the receiver has multiple instances of the app, the sender's secure collaboration app will authenticate the app-level public key for each of the receiver's instantiations of the secure collaboration apps. When the signature attached to the app-level public key is successfully validated, the sender's secure collaboration app uses the received app-level signing public key to validate the signatures appended to the received ephemeral ECDH public component.

After authenticating the one or more receivers' public information, the sender composes his or her communication to the one or more receivers in block 515. As noted above, the communication may be a text message, chat room message, file sharing, file collaboration, control message, command, e-mail, document, audiovisual file, Short Message Service message (SMSes), voice call (i.e., VOIP), video call, and video conference. Continuing the example described above with respect to FIG. 4, the message providing the metadata to the one or more receivers is a control message that notifies the one or more receivers' secure collaboration apps that the sender is sharing a file with the one or more receivers. The payload of the control message will include the metadata of the first encrypted file.

While the sender's secure collaboration app is composing the communication to the one or more receivers, the sender's secure collaboration app generates the second encryption key in block 520. As noted above, the sending client's secure collaboration app may use the crypto accelerator to generate the second encryption key by applying multiple rounds of a hash function (e.g., SHA256, SHA384, SHA521) to a second set of pseudorandom bytes. Once the communication is composed and the second encryption key is generated, the sender's secure collaboration app will encrypt the communication in block 525. The secure collaboration app encrypts the communication using a symmetric encryption algorithm. Continuing the example above, the sender's secure collaboration app encrypts the metadata, via AES, using the second encryption key.

In block 530, the sending client's secure collaboration app generates a pair of ephemeral ECDH components. The pair of ephemeral ECDH components is generated using ECC with a P-521 curve. In block 535, the sending client's secure collaboration app derives a key-encrypting key using the receiver's ephemeral ECDH public component and the ephemeral ECDH private component generated by the sending client's secure collaboration app. In various embodiments, the key-encrypting key is a 256-bit key derived using ECDH.

In block 540, the second encryption key is encrypted using the key-encrypting key. In various embodiments, the second encryption key is encrypted by the crypto accelerator using AES and the key-encrypting key. In block 545, the sending client's secure collaboration app encrypts the second encryption key again using the receiver's device key obtained from the security platform with the receiver's public information. Encrypting the second encryption key with an ephemeral component generated by the receiver's app and the device key provides a twice-encrypted second encryption key that effectively binds the message to the receiver's secure collaboration app and device.

In block 550, the sending client's secure collaboration app determines whether the receiver has multiple instantiations of the secure collaboration app installed on a plurality of devices. If so, the sender's app repeats blocks 535, 540, and 545 for each instance of the receiver's app. In this regard, each instance will receive a twice-encrypted second encryption key that is unique to that instantiation of the secure collaboration app. Accordingly, each instance will only be able to decrypt the twice-encrypted second encryption key that has been encrypted with the unique device key and ephemeral public component associated with that device.

When twice-encrypted second encryption keys have been generated for each of the receiver's instantiations of the secure collaboration app, the sending client's secure collaboration app composes a secure communication container in block 555. The secure communication container includes a payload and a header. The payload comprises the encrypted communication; the header of the secure communication container includes destination entries for each of one or more receivers' instantiations of the secure collaboration app. Each destination entry includes at least one of a twice-encrypted second encryption key; an identifier for the ephemeral ECDH component used to generate the key-encrypting key; and the sender's public ECDH component for the key-encrypting key. Following the example above, the payload of the secure communication container will contain the first encrypted file's encrypted metadata.

Once the secure communication container is assembled, the sending client's secure collaboration app will transmit the secure communication container to the one or more receivers in block 560. In various embodiments, the sending client's secure collaboration app transmits the secure communication container to the security platform. Accordingly, the security platform will notify each of the one or more receivers that they have a new communication waiting for them. Alternatively, the sender and receiver may communicate in a peer-to-peer manner. According to these embodiments, the sending client's secure collaboration app transmits the secure communication container directly to each of the one or more receivers in block 560.

Figure 6:
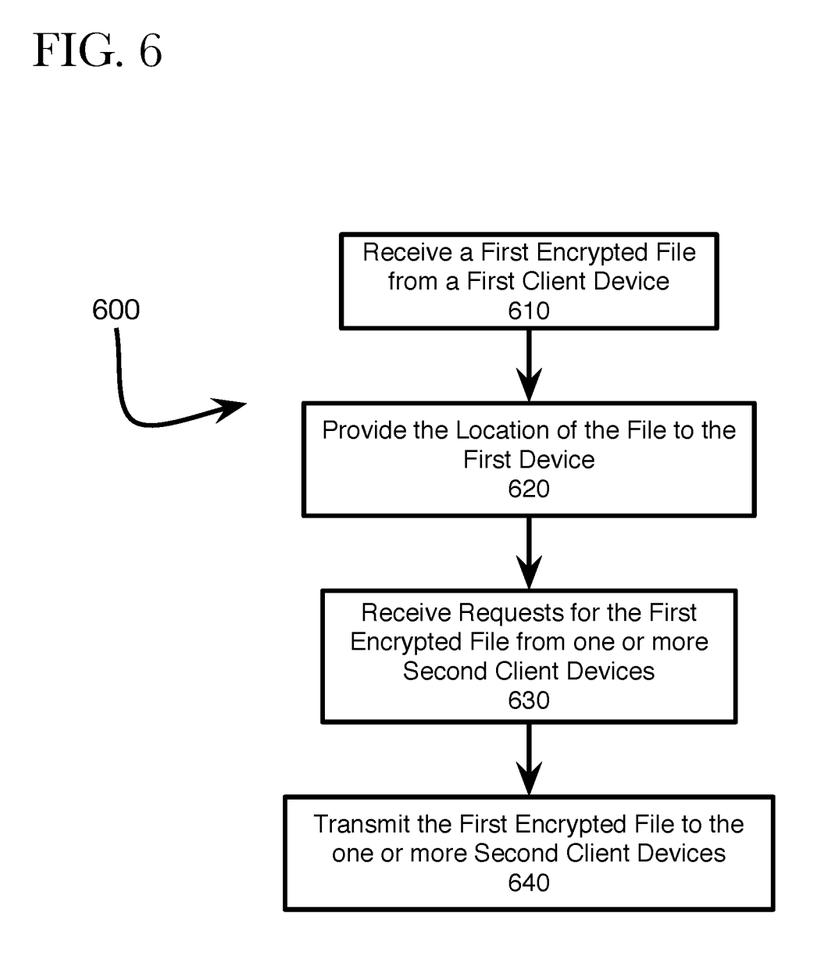
FIG. 6 shows a process for the secure file repository receiving and distributing encrypted files.

Turning to FIG. 6, a process illustrating how the secure file repository handles encrypted files is shown. The process 600 begins in block 610 with the secure file repository receiving the first encrypted file from the sending client's device. According to various embodiments, the first encrypted file is received over a secure channel, such as a channel secured by either the Secure Socket Layer (SSL) or Transport Layer Security (TLS) protocols. In block 620, the secure file repository provides the uploading client with a location of the first encrypted file in the secure file repository. The location information allows the uploading client to recover the first encrypted file. Additionally, the location information can be shared with other client devices so that they too can access the first encrypted file. In block 630, the secure file repository receives one or more requests for the first encrypted file from one or more receiving client devices. Typically, the requests received from the one or more receiving clients will include at least the random file name and the location of the first encrypted file. In response to receiving the request from one or more receiving clients, the secure file repository transmits the first encrypted file to the one or more receiving client devices in block 640. In various embodiments, the secure file repository transmits the first encrypted file via a secure channel to the one or more receiving client devices.

Figure 7:
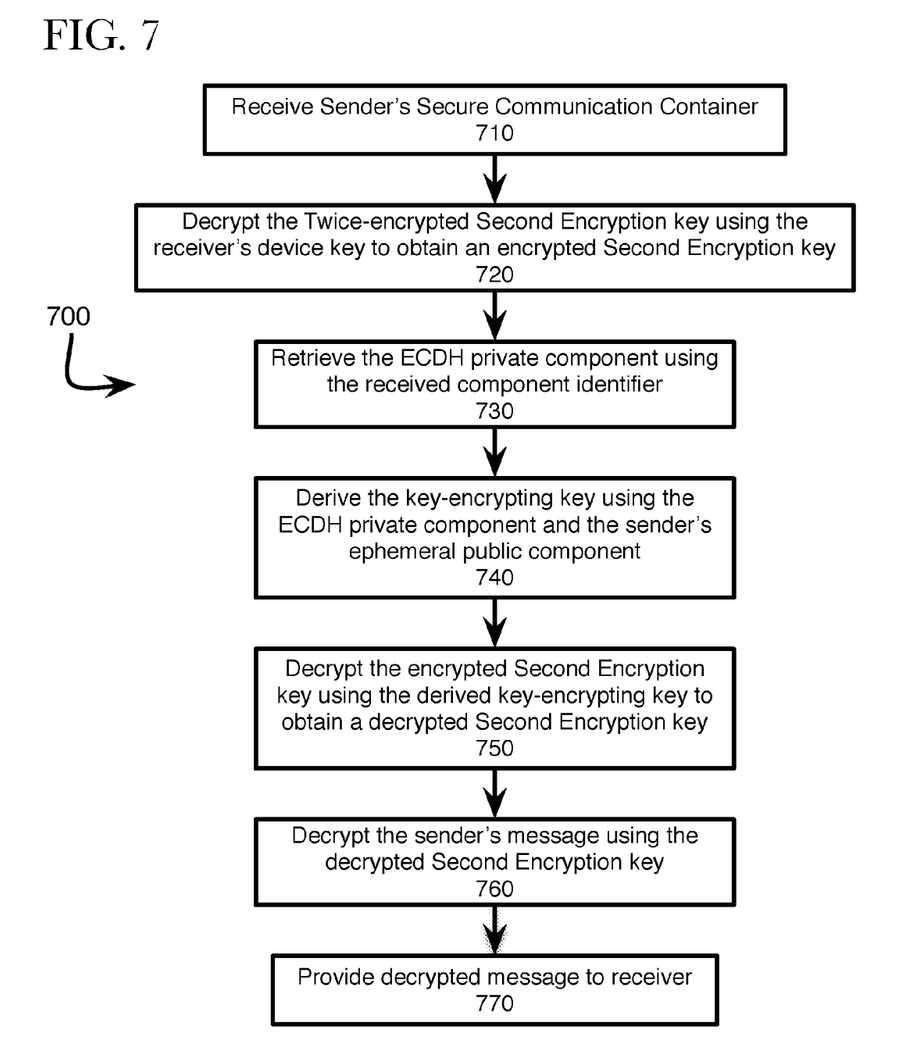
FIG. 7 illustrates a process for receiving and decrypting an encrypted communication received from a sender.

Prior to retrieving the first encrypted file from the secure file repository, the one or more receiving client devices must receive notification that a sending client is sharing a file with them. FIG. 7 illustrates an exemplary process 700 for receiving notification that a sender is securely transferring a file. In block 710, the one or more receiving client devices receive a secure communication container. The secure communication container may contain a communication or a control message. In examples where the secure communication container includes a communication, the receiving client device may receive an alert, such as a push notification, which prompts the receiving client device's secure collaboration app to connect to the security platform and retrieve the sender's secure communication container. In examples where the secure communication container includes a control message, the secure communication container may be pushed directly to the receiving client's device, which prompts the receiving client device's secure collaboration app to decrypt the received control message using the steps described below and execute the command or instruction contained in the payload of the secure communication container.

As noted above, the header of the secure communication container includes a destination entry that includes at least a twice-encrypted second encryption key. Accordingly, in block 720, the receiving client device's secure collaboration app decrypts the twice-encrypted second encryption key using the device key associated with the receiving client device. Next, in block 730, the receiving client's secure collaboration app uses the ECDH component identifier received in the secure communication container to retrieve the ephemeral ECDH private component that corresponds to the public component the sending client device used to generate the key-encrypting key. In block 740, the receiving client's secure collaboration app derives the key-encrypting key using the retrieved ephemeral private component and the sender's ephemeral public component that was transmitted in the secure communication container. After deriving the key-encrypting key, the receiving client device's secure collaboration app decrypts the encrypted second encryption key in block 750 to obtain the second encryption key. In block 760, the second encryption key is used to decrypt the payload of the secure communication container. In various embodiments, the payload is decrypted via a symmetric encryption/decryption scheme, such as AES, DES, or 3DES. In examples where the payload contains a communication—such as a message, the decrypted communication may be provided to the receiver in block 770. In examples where the payload contains a control message, the receiving client's secure collaboration app may execute the command or instruction contained in the control message. In this regard, the secure collaboration app may display an indication regarding the command executed. For example, if the control message contains information about retrieving a file, an icon may be displayed to the user prompting them to download the file. Alternatively, the file may be retrieved by the secure collaboration app automatically and provide a notification to the user that a file is being shared by the sender.

Figure 8:
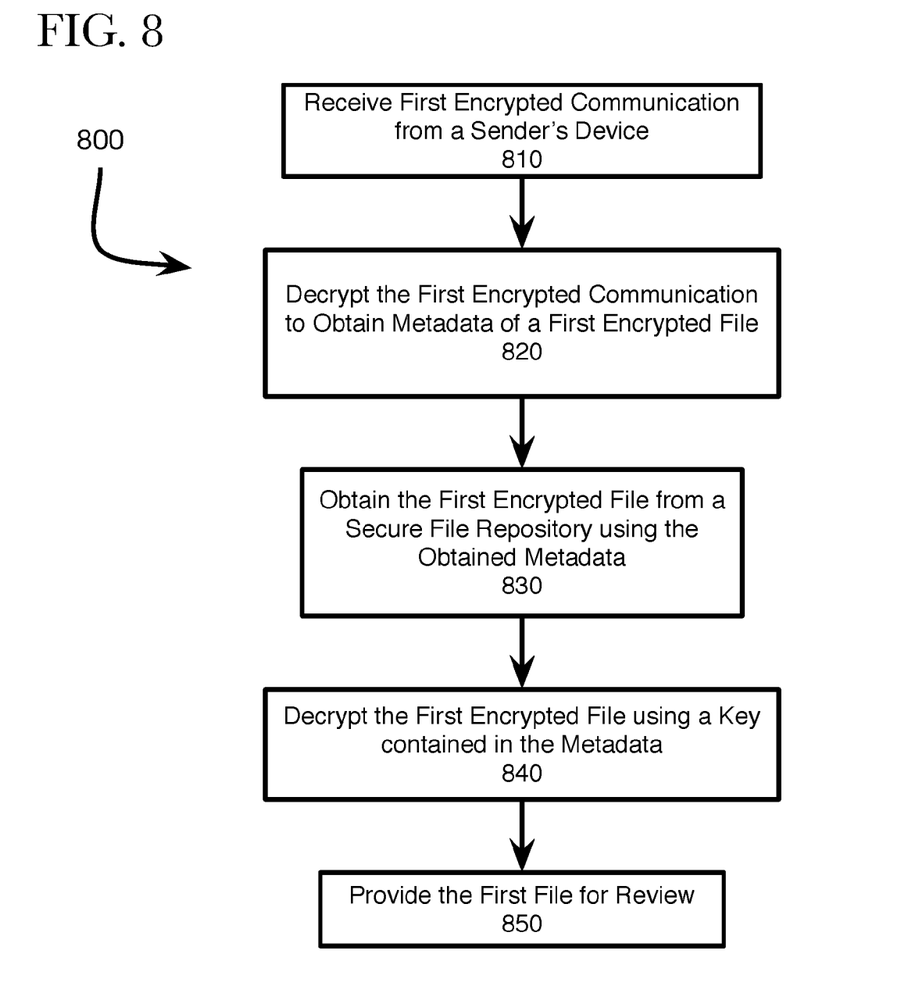
FIG. 8 illustrates an exemplary process of a receiving client's secure collaboration app retrieving and decrypting the first encrypted file.

FIG. 8 illustrates an exemplary process 800 of a receiving client's secure collaboration app retrieving and decrypting the first encrypted file. The process 800 begins in block 810 when one or more of the receiving clients' secure collaboration apps receive a first encrypted communication from a sender's device. In various embodiments, the first encrypted communication is a secure communication container; the payload of which includes the first encrypted file's encrypted metadata. As noted above, the first encrypted file's metadata comprises at least the first encryption key, the random file name assigned to the first encrypted file, and the location of the first encrypted file on the secure file repository. In block 820, the receiving client's secure collaboration app decrypts the secure communication container using the process described above in FIG. 7. Specifically, the receiving client's secure collaboration app obtains the second encryption key using the techniques described above and uses it to decrypt the payload of the secure communication container to obtain the first encrypted file's metadata. In this regard, the security platform ensures that only intended receivers can access the file on their respective devices, thereby preventing unauthorized users from accessing the file even if they were to receive notification of the secure file transfer inadvertently.

After decrypting the payload of the first encrypted communication and retrieving the first encrypted file's metadata, the receiving client's secure collaboration app retrieves the first encrypted file from the secure file repository in block 830. Specifically, the receiving client device's secure collaboration app uses the random file name and the location information contained in the metadata to obtain the first encrypted file from the secure file repository. In various embodiments, the first encrypted file is transferred from the secure file repository to the receiving client device via a secure channel. After receiving the first encrypted file from the secure file repository, the receiving client's secure collaboration app decrypts the first encrypted file using the first encryption key contained in the decrypted metadata. In block 850, the decrypted first file is provided to the user for review.

While the above-described embodiments describe sharing one file with one or more receivers, the above-described techniques may apply to the sharing of multiple files. In this regard, a unique encryption key would be generated for each file. Accordingly, the metadata for each file may be encrypted using the techniques described above. The metadata for each file may then be transmitted in one secure communication container or several secure communication containers.

Although the foregoing embodiments have been described in some detail for purposes of clarity of understanding, the present disclosure is not limited to the details provided. There are many alternative ways of implementing the present disclosure. The disclosed embodiments are illustrative and not restrictive.

What is claimed is:

1. A system, comprising:
a processor configured to:
obtain on a first device, a first file to upload to a secure file repository;
generate, by the first device, a first encryption key, wherein the first encryption key is generated at least in part by obtaining ephemeral environmental noise from a kernel operation executing on the first device;
generate, by the first device, a random file name for the first file, wherein the random file name is a universally unique identifier;
encrypt, at the first device, the first file via an encryption algorithm using the first encryption key;
assign, at the first device, the generated random file name to the first encrypted file; and
upload, from the first device, the first encrypted file to the secure file repository; and
a memory coupled to the processor and configured to provide the processor with instructions.

2. The system of claim 1, wherein the secure file repository is a third-party file repository.

3. The system of claim 1, wherein the secure file repository is part of a security platform.

4. The system of claim 1, wherein the processor is further configured to:
update metadata associated with the first encrypted file, including at least one of the first encryption key, a location of the first encrypted file, and the random file name.

5. The system of claim 4, wherein the processor is further configured to:
store the updated metadata associated with the first encrypted file in a secure database in the memory of the first device.

6. The system of claim 1, wherein the processor is configured to:
retrieve, by the first device, the first encrypted file from the secure file repository; and
decrypt, by the first device, the first encrypted file using the first encryption key.

7. A method comprising:
obtaining, by a first device, a first file to upload to a secure file repository;
generating, by the first device, a first encryption key, wherein the first encryption key is generated at least in part by obtaining ephemeral environmental noise from a kernel operation executing on the first device;
generating, by the first device, a random file name for the first file, wherein the random file name is a universally unique identifier;
encrypting, by the first device, the first file via an encryption algorithm using the first encryption key;
assigning, by the first device, the generated random file name to the first encrypted file; and
uploading, from the first device, the first encrypted file to the secure file repository.

8. The method of claim 7, wherein the secure file repository is a third-party file repository.

9. The method of claim 7, wherein the secure file repository is part of a security platform.

10. The method of claim 7, comprising:
updating, by the first device, metadata associated with the first encrypted file, including at least one of the first encryption key, a location of the first encrypted file, and the random file name.

11. The method of claim 10, comprising:
storing, at the first device, the updated metadata associated with the first encrypted file in a secure database in the memory of the first device.

12. The method of claim 7, comprising:
retrieving, by the first device, the first encrypted file from the secure file repository; and
decrypting, by the first device, the first encrypted file using the first encryption key.

13. A non-transitory computer-readable medium comprising instructions that, when executed by at least one processor, perform the steps of:
obtaining a first file to upload to a secure file repository;
generating a first encryption key, wherein the first encryption key is generated at least in part by obtaining ephemeral environmental noise from a kernel operation executing on a first device;
generating a random file name for the first file, wherein the random file name is a universally unique identifier;
encrypting the first file via an encryption algorithm using the first encryption key;
assigning the generated random file name to the first encrypted file; and
uploading the first encrypted file to the secure file repository.

14. The non-transitory computer readable medium of claim 13, wherein the secure file repository is a third-party file repository.

15. The non-transitory computer readable medium of claim 13, wherein the secure file repository is part of a security platform.

16. The non-transitory computer readable medium of claim 13, comprising instructions for:
updating metadata associated with the first encrypted file, including at least one of the first encryption key, the location of the first encrypted file, and the random file name.

17. The non-transitory computer readable medium of claim 16, further comprising instructions for:
storing the updated metadata associated with the first encrypted file in a secure database in the memory of the first device.

18. The non-transitory computer readable medium of claim 13, comprising instructions for:
retrieving the first encrypted file from the secure file repository; and decrypting the first encrypted file using the first encryption key.

\* \* \* \* \*